March 24, 1953 — W. VON EDIGER — 2,632,731
PROCESS FOR THE PRODUCTION OF ACETYLENE FROM LIQUID HYDROCARBONS
Filed June 7, 1949 — 4 Sheets-Sheet 3

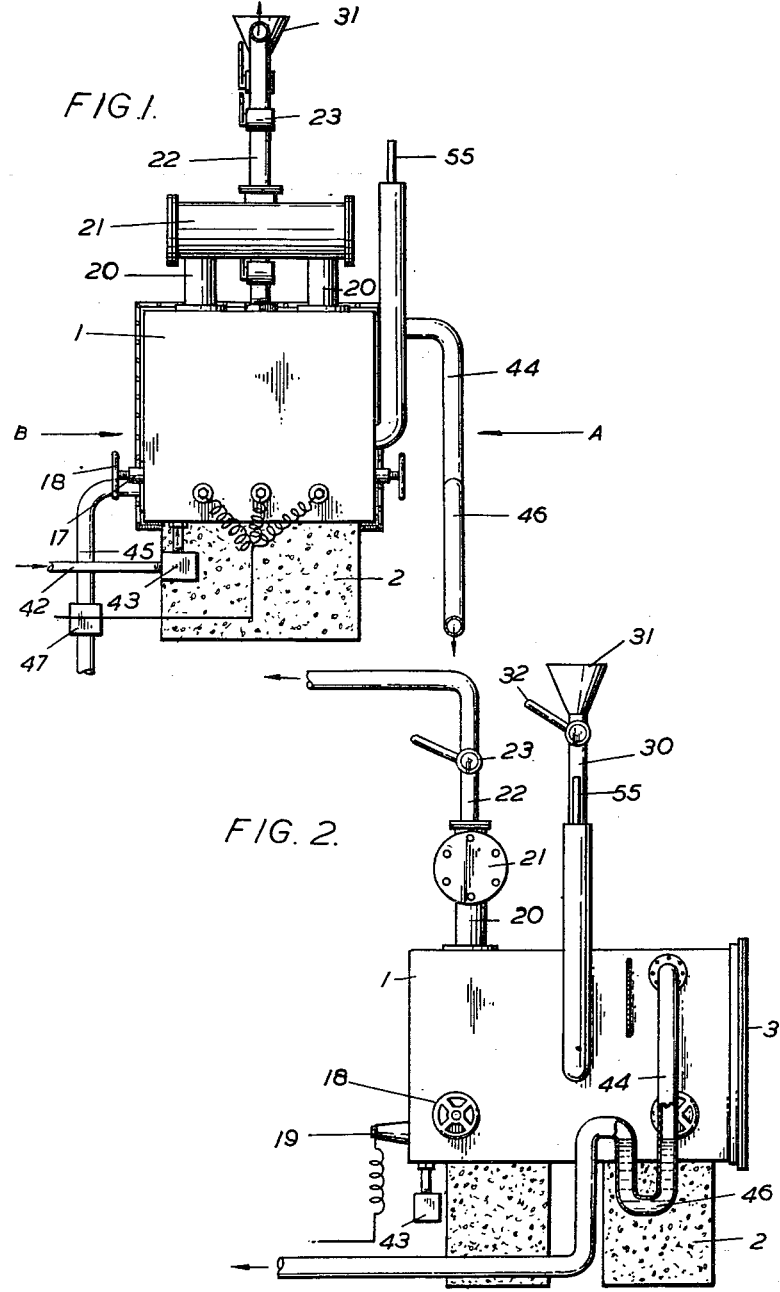

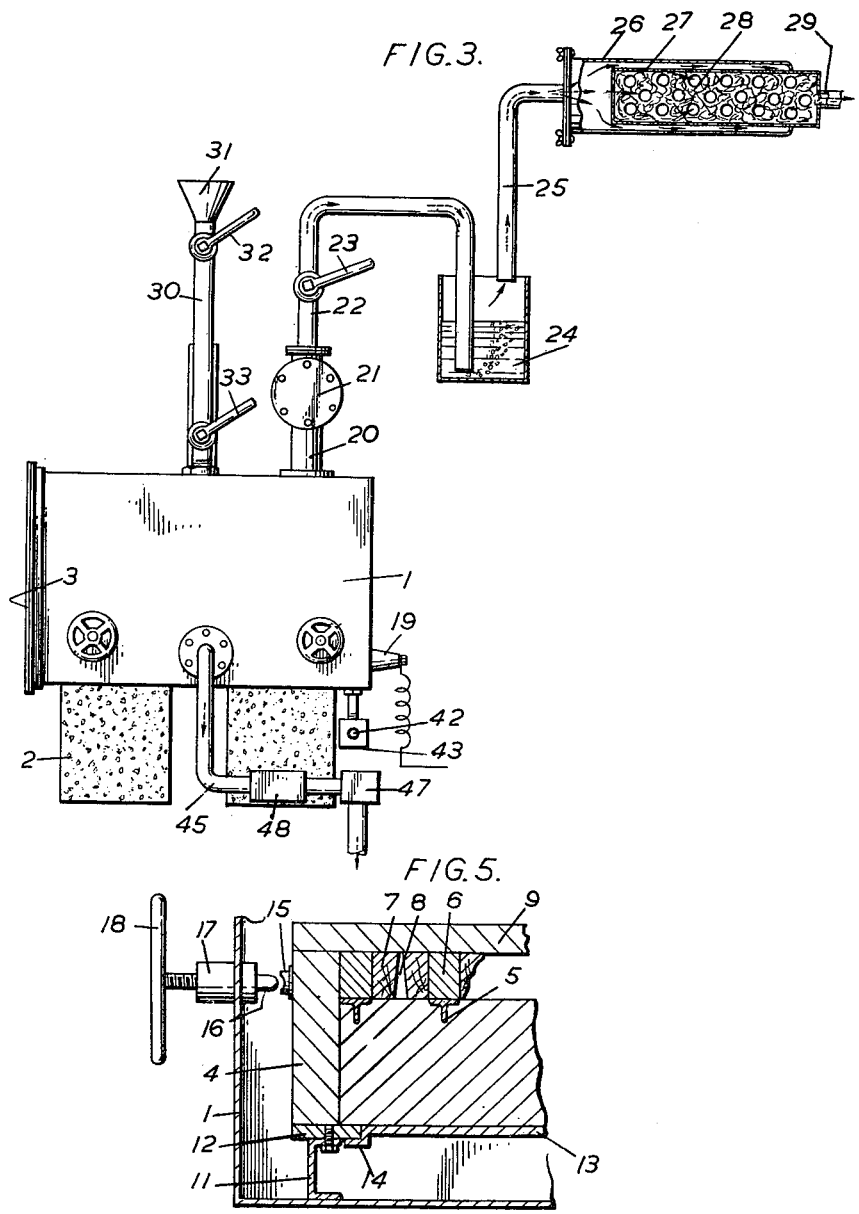

Inventor:—
Wladimir Von Ediger,
By Smith, Michael & Gardiner,
Attorneys

March 24, 1953   W. VON EDIGER   2,632,731
PROCESS FOR THE PRODUCTION OF ACETYLENE
FROM LIQUID HYDROCARBONS
Filed June 7, 1949   4 Sheets-Sheet 4

Inventor:-
Wladimir Von Ediger,
By Smith, Michael and Gardiner,
Attorneys.

Patented Mar. 24, 1953

2,632,731

UNITED STATES PATENT OFFICE 2,632,731

PROCESS FOR THE PRODUCTION OF ACETYLENE FROM LIQUID HYDROCARBONS

Wladimir von Ediger, London, England, assignor, by mesne assignments, to Technical Assets Incorporated, New York, N. Y.

Application June 7, 1949, Serial No. 97,588
In Great Britain June 17, 1948

7 Claims. (Cl. 204—171)

This invention relates to the production of acetylene and other gases, and carbon black by the physico-chemical treatment of liquid hydrocarbons. More especially it is concerned with the electro pyrolysis or cracking of liquid hydrocarbons by intermittent electric arc discharges therein between a multiplicity of carbon granules immersed between electrodes in the liquid hydrocarbon under treatment.

The object of the invention is to provide a method and apparatus for the production of acetylene, other gases and carbon black by such arc discharges, which will operate in a continuous manner and more cheaply and efficiently than any heretofore employed.

With this end in view the invention consists in a method of producing acetylene from liquid hydrocarbons wherein a multiplicity of conducting particles, disposed as a shallow layer, immersed in the hydrocarbon and lying closely adjacent to one another, are employed as electrodes between which intermittent electric arc discharges are generated, the particles being sufficiently loosely disposed to allow escape of the generated gases from the regions of discharge promptly after formation. The discharges cause the evolution of acetylene and other products by pyrolysis of the hydrocarbon and the particles are loosely disposed within the hydrocarbon to allow rapid escape of the generated gases from the regions of discharge. Preferably also the particles are supported in the hydrocarbon in such a manner as to allow the hydrocarbon to circulate freely, during the discharge operation, in the containing vessel.

The invention also consists in apparatus for the production of acetylene from liquid hydrocarbons comprising means for supporting a shallow layer of conducting particles immersed in the liquid hydrocarbon, and means for effecting intermittent electric arc discharges between adjacent particles of the layer through the hydrocarbon.

The particles may be loosely carried on a support which may be in the form of a shelf or tray, or a plurality of shelves or trays, mounted for example, in spaced relationship above one another. Each shelf or tray may be provided with two or more fixed electrodes in the form of spaced conducting strips or annuli, between which the particles are located, serving as electrodes connected by suitable wiring to an external source of electric power supply whereby intermittent arc discharges are generated between the adjacent particles. The gases and other by-products generated by these discharges rise through the hydrocarbon and are led off by suitable piping for separation, purification and storage or use.

The invention will be clearly understood from the following description of one manner of carrying it into effect, and of various forms of apparatus (all being given merely by way of example) which may be employed, and this description will be more readily followed by reference to the accompanying drawings wherein.

Figure 1 represents a vertical end elevation of apparatus employed for producing acetylene and other products according to the invention;

Figures 2 and 3 represent side elevational views of the apparatus shown in Figure 1 (partly in section), respectively from directions shown by the arrows A and B; and Figures 4a, 4b, 5, 6 and 7 represent details of apparatus employed in accordance with the invention.

Various methods for producing acetylene have been proposed and attempted in the past. Apart from the commonly used method of production from the chemical interaction of calcium carbide and water, acetylene has also been produced by the "cracking" of hydrocarbons at high temperature, and inter alia the electric arc discharge has been used for that purpose. As heretofore employed, however, the electric arc has been found to be very inefficient, and this may be attributed to two main reasons:

1. The flame zone of the arc is very small and thus penetrates only a small volume of hydrocarbon; and 2. The reaction occurs very rapidly and although initially molecules may recombine to form acetylene and other gases, this synthesised product is liable again to be disintegrated by the arc unless the gases are quickly removed from the arc zone, and the net proportion of the desired gases ultimately recovered is thus greatly reduced.

With a view to meeting the first mentioned of these difficulties it has been proposed to employ substantially simultaneously a large number of arcs for "cracking" the hydrocarbon, these arcs being produced between adjacent elements, packed as a column, of small conducting bodies, e. g. small carbon spheres, immersed in the liquid, the column being supplied with electric power at a suitable voltage from an external source. This method fails to overcome the second of the above mentioned difficulties, since gases synthesised at any one arc are subject to other arc discharges as they rise through the column. Moreover this method is open to the objection that after a short while the carbon spheres wear away, and the process must be stopped to remove and replace them in order to rebuild the column. Such discontinuity of the process renders it both inefficient and unattractive economically.

In the method employed according to the present invention pyrolysis of the hydrocarbons is effected by multiple arc discharges between a substantial number of conducting bodies, e. g. carbon spheres, immersed therein, but these bodies are so arranged as to allow the generated gases quickly to escape from the arc discharge zones after formation, and the relative time periods of arc discharge and quiescence may be appropriately adjusted to ensure or facilitate such escape. Furthermore it is possible, in view of this arrangement of the conducting bodies, to provide for removal and replenishment of worn and reduced elements without arresting the process, which thus becomes of a continuous nature. Details of the method, and of convenient forms of apparatus for making it effective, will appear from the following description thereof.

Figure 4A:
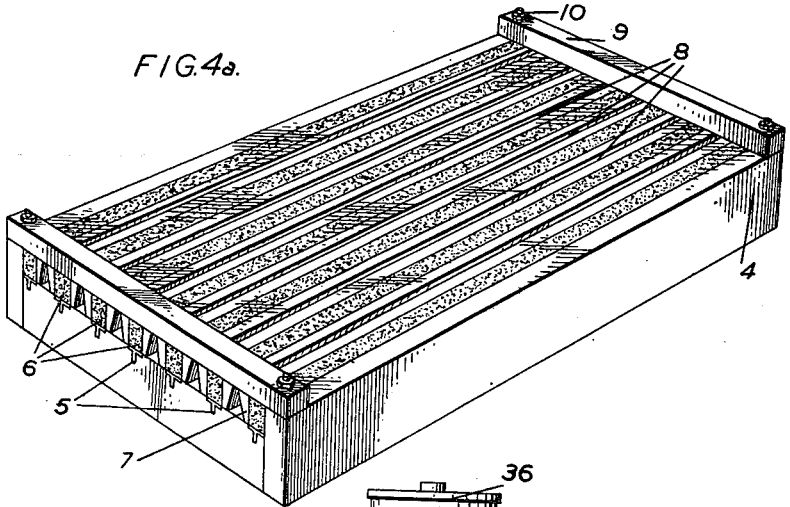

In carrying the invention into effect in one convenient manner, as shown in Figures 1–3 of the accompanying drawings, there may be provided a closed metal tank 1 mounted on a suitable base, such as concrete standards 2, and having a removable end plate 3 allowing access, as desired, to the interior. Within this tank is mounted a framework of fixed electrode elements (Figures 4a and 5) which may conveniently comprise a rectangular open box-like structure 4 of wood or other non-conducting material between the ends of which extend several T-sectioned iron supports 5 parallel to one another, upon each of which is supported an electrode element, 6, e. g. of rectangular carbon rod. The sides of each element 6 are held by longitudinal members 7 of wood or other nonconducting material, spaced apart by a suitable pre-arranged distance to leave slots 8 between adjacent electrode-element assemblies. The elements 6 and members 7 are held down at their ends by cross-struts 9 secured to the main frame 4 by bolts 10.

As will clearly appear hereinafter it is important for the efficient operation of the apparatus that the above described electrode-bearing framework shall be firmly secured in the tank 1 with its upper surface horizontal. For this purpose there may be welded to the inner surface of the base of the tank two parallel channelled supports 11 to the top of each of which is secured, e. g. by screws, a flat steel rail 12. Beneath the frame 4 may be secured a steel plate 13 having bracket-shaped edges 14 which serve as guides fitting on to the rails 12. For rigidly fixing the frame in position there are fitted to the sides thereof recessed socket members 15 adapted to be engaged by the clamping ends of screws 16 mounted in glands 17 in the side walls of the tank 1, and operable by external hand wheels 18. The centre line of each screw 16 is slightly below the centre line of its associated socket 15, so that when they are firmly engaged a vertically downward force is applied to the framework, holding it securely against the rails 12. The tank is accurately set upon its standards 2 when first installed so that the rails 12 are horizontal, and it will be seen that by virtue of the arrangements described above the frame 4 readily assumes a horizontal position whenever fitted into the tank, although it is easily removable as occasion requires for inspection, repair or replacement. When the framework 4 is fitted in position the electrode elements 6 are connected by their ends to terminals 19 in the end wall of the tank 1, and to which power is supplied from a suitable external source.

When the framework 4 has been fitted into the tank in the above described manner its surface is covered with a shallow layer of granules of conducting material, such as small spheres or cylinders of carbons, and the tank having been closed by the end plate 3 is filled to a suitable level with liquid hydrocarbon from which acetylene is to be produced. When thereafter electric power is supplied through the terminals 19 to the electrode elements 6 on which are resting the aforesaid conducting granules, arc discharges take place and effect pyrolysis of the hydrocarbon. This intermittent arc discharge is assisted by the turbulence of the liquid, set up by gas generated by the arc, as it rises through the liquid, which causes the freely movable granules to oscillate and thereby repeatedly make and break contact with one another and with the fixed electrodes, whereby to bring about frequent multiple arc discharges. The gases generated by these discharges contain a high proportion of acetylene, and it will be seen that on account of the shallowness of the layer of conducting bodies they are able to escape from the zones of the arcs very promptly after formation, and to enter, and flow upwards through, the much cooler liquid hydrocarbon. It will further be noted that for efficient operation the conducting granules should be spread evenly over the electrode area of the framework 4, and, bearing in mind that the granules are freely mobile, the importance of setting that electrode surface horizontal (as previously described) in order to prevent the granules from piling up at one end or side, will be appreciated.

Figure 4B:
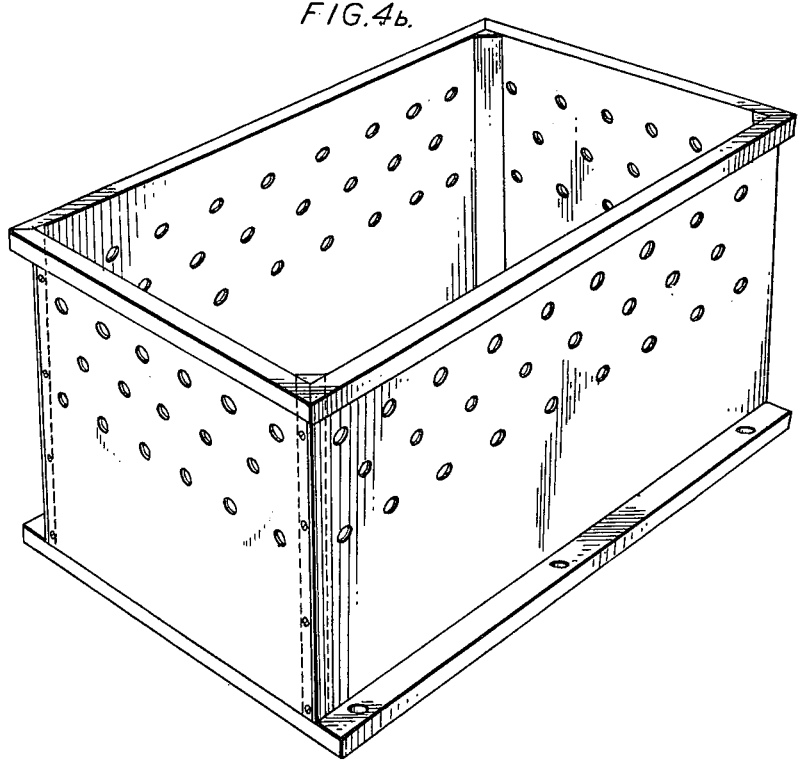

In order to prevent the granules from becoming displaced in a sideways direction from the electrode area of the framework 4 by turbulence set up by the arc discharges or otherwise there may also be provided a retaining member, which may take the form shown in Figure 4b, consisting of a rectangular structure, open at top and bottom, formed of side-wall panels e. g. of three-ply wood, held together by a stiffening wooden framework. Side flanges at the bottom of this structure are provided with screwholes, as shown, through which pass screws for securing the structure to the framework 4 so that the side walls surround the space occupied by the granules. The side walls may be apertured as shown, to allow passage of liquid hydrocarbon while retaining the granules. The front panel of this structure may be detachable from its stiffening frame to allow access to the interior, while the structure is in operating position, without having to remove the whole structure.

The gases generated by the arc discharges as described above rise through the liquid hydrocarbon and escape from outlets at the top of the tank 1. In the apparatus shown they may pass through pipes 20 to a gas collector 21 from which they are led away by a pipe 22, in which may conveniently be fitted a hand-operable cock 23. Since the escaping gases are of a combustible nature it is desirable to provide a flame trap to prevent back-flow of air into the tank 1. This flame trap may comprise a water-bath 24 in which the outlet of pipe 22 is immersed, so that the escaping gases are bubbled through the water and pass out through a pipe 25 (Figure 3).

The arc discharges not only generate acetylene and other gases, but also release highly dispersed carbon black. While much of this remains suspended in the liquid hydrocarbon a small proportion is liable to be carried away by the escaping gases, and means may be provided for removing this carbon black from the gas stream before storage of the gas. These means may, for example, consist in a trap comprising an external cylinder 26 carrying a concentric inner perforated cylinder 27 packed with cotton waste or like absorbent material 28. The gases entering cylinder 26 pass through the perforations of cylinder 27 and the absorbent material 28, from which they are conducted to a gas holder by tube 29. The carbon black is arrested by the absorbent material which can be replaced from time to time, as necessary.

The conducting granules are preferably initially of substantially uniform size, and as will hereinafter appear, of optimum size for efficient operation. As the arc discharges continue, however, the granules become reduced in size, and, if allowed to remain on the electrode surface of the framework 4, would lower efficiency. This difficulty is met by the provision of the slots 8 in the surface of the framework assembly, which are of such width that the granules, as soon as they become reduced to a pre-arranged size liable to lower efficiency, automatically fall through to the base of the tank 1 where means may be provided to remove them, or they may be allowed to rest until the tank is reopened for cleaning etc. after completion of an operating cycle.

When the reduced granules have fallen through the slots 8 it is necessary to replace them in order to maintain a complete covering layer of granules over the electrode surface of frame 4. While such replacement may be effected by stopping the apparatus, emptying the tank and removing the end plate 3, it is preferred, according to the invention, to provide means whereby replenishment may be effected during operation of the apparatus, which may thus be substantially continuous. One form of such means, shown in Figures 1-3 herewith, comprises a pipe or chute 30 standing up from and opening into the top of the tank 1. A hopper 31 at the top of the pipe 30 may be filled with new conducting granules, and the pipe 30 is provided with cocks 32, 33. By opening cock 32 granules fall into the pipe 30, whereafter cock 32 is closed and cock 33 opened to allow the granules to fall into the liquid hydrocarbon in the tank and sink to the electrode surface of framework 4 below. Means may be provided for interlocking cocks 32, 33, so that only one may be opened at a time. Since one or other of the cocks remains closed during this operation, no outlet from the tank is provided for gas escape, and the operation may therefore be carried out while the apparatus is working.

Figure 6:
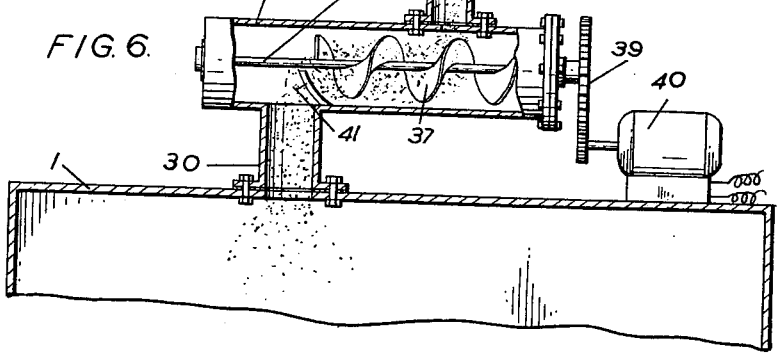

An alternative device which may be employed, in accordance with the invention, for automatically replenishing spent conducting granules in the tank, is shown in Figure 6 of the accompanying drawings. In this device the pipe 30 communicates with a cylindrical horizontal chamber 34 on which is secured a hopper 35 closed by a sealing plate 36. This hopper 35 is filled with new granules and closed before the apparatus is put into operation. A worm 37 on shaft 38 axially mounted in chamber 34 is driven through gearing 39 by an electric motor 40 mounted on the tank 1 adjacent to the chamber 34. A barrier partition 41 adjacent to the mouth of pipe 30 normally prevents the granules from entering the pipe 30, but when the motor 40 is running the worm 37 feeds granules to and over this partition so that they enter the pipe 30 and the tank 1 to sink through the liquid hydrocarbon on to the fixed electrode surface. As the number of granules is reduced by wear the arc discharge current falls. The circuit of motor 40 may incorporate any convenient on-off relay connected to a pick-up device in the arc discharge circuit, sensitive to changes in the discharge current and arranged to be actuated when the discharge current falls below a prearranged value in order to switch on the motor 40, and to be released (thereby switching off the motor 40) as soon as the discharge current is restored to a prearranged value.

As previously explained it is most desirable for the gases as soon as possible after generation to escape from the heated arc zone to cooler conditions and it is therefore undesirable for the liquid hydrocarbon in the tank 1 to reach a high temperature. For this reason means should be provided for cooling the liquid. While any convenient means may be employed for this purpose, one satisfactory arrangement is to provide for circulation of the liquid hydrocarbon between the tank 1 and an external supply, e. g. a separate cooling tank. For this arrangement the liquid may be fed into the base of the tank 1 through an inlet pipe 42 (Figure 1) with which is associated a suitable pump 43, while it may pass out of the tank through two outlet pipes 44, 45 (Figures 1-3). The pipe 44 may be regarded as an overflow pipe which determines the upper level of the liquid hydrocarbon in the tank 1, and is preferably provided with a U-tube seal 46 to prevent escape of gas. Normal circulation occurs through outlet pipe 44.

Figure 7:
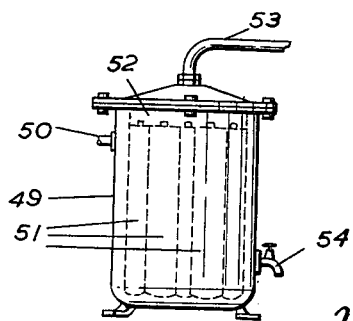

As explained above the arc discharge not only generates acetylene and other gases, but also causes the deposition of highly dispersed carbon black, most of which remains suspended in the liquid hydrocarbon. The circulation of the liquid allows this carbon black (which is a valuable by-product of the method according to the present invention) to be recovered in a simple and continuous manner. For this purpose there is incorporated in the outlet pipe 45 a filter 47 of any convenient form through which the liquid hydrocarbon is passed (if necessary by an impelling pump 48, Figure 3). One convenient known form of filter which may be employed is illustrated diagrammatically in Figure 7 and comprises a casing 49, with feed inlet 50, having mounted therein several porous ceramic cylinders 51 communicating at their open ends with an enclosure 52, in the casing 49, having an outlet pipe 53. Liquid hydrocarbon with suspended carbon black is fed through pipe 50, and the liquid permeates through the cylinders 51 to the outlet 53, whereas the carbon black is retained by the cylinders 51 in the casing 49 and can, from time to time, be removed. If desired the casing 49 may be provided, as usual, with a drainage cock 54.

Apparatus constructed and operated in the manner described above allows efficient production of gases, having a high proportion of acetylene, from liquid hydrocarbons, as well as a substantial amount of high-quality, highly dispersed carbon black, in a continuous and efficient manner. The optimum constructional details and dimensions, and the physical and chemical conditions of operation, depend upon a number of factors, which are taken into consideration in accordance with well-established technical principles when the apparatus is designed. Thus the A. C. power supply may be of single phase, triple phase or polyphase, and the number of terminals 19, and manner of connection to the supply will vary accordingly. Any voltage and/or frequency may be employed. The normal A. C. supply of 50 C. P. S. has been found satisfactory, and voltages between, say, 300 and 6000 volts are suitable, the value of 1000 volts having been found satisfactory for general use. High frequency current at high voltage has some theoretical advantages, but the gain seems hardly justified on account of technical difficulties.

The fixed electrode elements 6 may be of any convenient conducting material. Carbon electrodes have been found very suitable, or they may be formed of graphite. Metal electrodes may be used and are simpler to install, but in general tend adversely to affect the quality of the carbon black produced. The metal or alloy used should be such as not to react chemically with the hydrocarbon and/or the gaseous products in the tank, and should clearly not include metals liable to generate, with the acetylene, an explosive mixture or compound. The length and number of the electrode elements will be determined by the applied voltage and the total power consumption planned according to the acetylene production rate desired, while their spacing will also be influenced by the resistance of the mobile granule conductors through which discharges from the electrodes 6 take place. A satisfactory spacing between the electrodes has been found to be $V/100$ cms. where V is the voltage applied thereto. The width and thickness of the electrodes is not theoretically of importance, save that increased dimensions guard against transverse vibrations, and also generate less heat during operation, so that better wear is ensured. Electrodes of square cross-section have been used, of 4 cms. thickness for lower voltages, and 5 cms. thickness for higher voltages. It has been found that the presence of moisture is disadvantageous, and the framework 4, if made of wood, should preferably be thoroughly dried before use. While wood has been found most suitable, the framework may be made of any other suitable non-conducting material, e. g. ceramic, porcelain, artificial resins, etc., some of which avoid the danger of introducing moisture into the tank.

The mobile conducting elements which are spread in a shallow layer on the electric framework 4 may be of any convenient material, having regard to the requirement that they must be in oscillatory or discontinuous movement within the hydrocarbon. Carbon granules have been found very suitable and may be prepared from pure carbon (e. g. the carbon black produced by the process has been found very suitable) mixed with sufficient organic binding material, e. g. glucose, to form a paste, suitable for compressing into granules (e. g. at 150–200 atmospheres per square c. m.), after which the granules are baked at a temperature gradually increased to, say, 450° C., until they acquire a coke-like character. The granules used should initially be of substantially uniform size, e. g. within ±1.5 mm. of the selected standard diameter. Alternatively the granules may be cut as cylinders from carbon electrodes (e. g. as used for cinematograph projectors). The shape of the granules is not of great importance from the point of view of operating the apparatus. Some convenience arises from the use of sperical granules in that they wear away in an even and uniform manner, but cylindrical granules are simpler and easier to manufacture, while splintered, irregular shapes may also be employed, preferably after passing through a sieve to ensure reasonable uniformity of overall dimensions.

The size of granules employed depends inter alia upon the working voltage used. For a 300 volt supply granules of about 12 mm. width have been found satisfactory, the size decreasing with increased voltage. Thus convenient sizes may be 8 mm. at 500–1000 volts, 6 mm. at 1000–2000 volts and 3–4 mm. at 6000 volts. It has also been found that the optimum size for the granules is related to the width of the fixed electrode elements 6, and should be smaller when narrower electrode elements are employed. Thus in apparatus consuming 200–300 kw. it has been found that optimum results are obtained using granules of size approximately ⅛ of the width of each electrode element 6 e. g. using 6 mm. granules on 50 mm. electrode elements. As the granules wear away in operation the overall resistance across the fixed electrodes, and thus the average power consumption, increases. The slots 8 between the electrodes are of selected width to ensure that granules will fall therethrough as soon as they reach a minimum size for maintaining power consumption at a prearranged maximum value, having regard to the voltage used and other physical conditions prevailing.

The granules are uniformly spread on the electrodes in sufficient numbers to produce a shallow layer across the whole upper surface within the framework 4. In general the most convenient thickness of layer corresponds to the depth of a single granule, but it is within the scope of the invention to employ a layer of greater thickness (e. g. corresponding to the depth of two superposed granules), having regard to the requirement of rapid escape of generated gases after synthesis. The concentration of granules should be such that they contact one another when the apparatus is not in operation, but are free to move, and thus break contact, when in operation. It will be appreciated that if the granules pile to one side or end of the electrode frame surface energy is wasted in generating heat which is dissipated without useful result, for which reason the importance of ensuring that the framework is horizontal and the granules evenly distributed thereon will at once be realised.

The conditions prevailing inside the tank during operation are of some importance. The temperature of the arcs may reach 2500–3000° C., but since there is not a large amount of heat and this is uniformly distributed the general temperature of the liquid hydrocarbon remains low (e. g. from 20–80° C.), and the escaping gases have a temperature of about 35° C. It is undesirable for the temperature to rise unduly, and if necessary means may be provided, as previously stated, to lower it. For this purpose circulation, as above described, is convenient and should be arranged at such a rate as to keep the liquid temperature in the tank not higher than about 80° C. If other means are employed they may be thermostatically controlled to maintain the liquid temperature below a prearranged value (e. g. 80° C.). The discharge reaction has been found to occur best if the pressure at the arc zone is not high. On the other hand the arcs should be discharged at a sufficient depth below the liquid hydrocarbon surface to prevent sparks therefrom causing explosion in the gas-filled space of the tank. Satisfactory arc discharge occurs at a pressure of about 15–25 cms. of water which may be achieved by locating the granule layer at a depth of 20–30 cms. below the upper liquid surface. The tank 1 is preferably of metal, and may conveniently be of iron sheet. It should be of sufficient thickness (and/or strengthened at suitable points) to prevent vibration and distortion, and should be rigidly mounted, and preferably anchored, on sturdy supports. If necessary (e. g. when acid asphalt, containing sulphuric acid, is to be treated) the tank may be internally coated (e. g. by painting with tar lacquer) or lined (e. g. with ebonite or an artificial resin).

The process may be applied to all liquid hydrocarbons but in the case of the more viscous hydrocarbons means may be provided to heat them in order to reduce viscosity, and facilitate flow and the escape of gases. Any convenient heating means may be employed at any convenient location in the tank, in the circulatory pipe system or in the oil storage tank. One convenient arrangement may comprise a steam-coil immersed in the liquid at a suitable point. As previously stated water in the reaction tank is undesirable, and for this reason means may be provided to dry the liquid hydrocarbon fed therein. Such means may comprise, for example, the provision, in the hydrocarbon storage tank or pipe system, of suitable water-absorbing salts with which the hydrocarbon comes into contact during its flow.

In apparatus such as described above various safety devices and/or control devices may be incorporated. As previously described a flame trap 24 is preferably provided at the gas outlet from the reaction tank. A similar flame trap is also preferably provided in the outlet from the gasometer in which the generated gases are collected.

A float (e. g. 55, Figures 1 and 2) is preferably provided in the reaction tank to indicate the level of the liquid hydrocarbon, and may be arranged (e. g. in conjunction with a variable electric resistance) to control means for maintaining the level at a prearranged height (preferably not less than about 20 cms.) above the discharge zone. A thermometer, and manometer or other gauge, of any convenient forms may be fitted to the tank to indicate respectively the temperature and pressure therein. The tank should be electrically connected to earth to avoid the possibility of electric shock, and the electrical leads into the tank should be located well below the level of the liquid therein, to avoid danger of igniting the generated gases and causing an explosion. Each lead should be provided with a fuse. Means may also be provided to prevent current to the electrodes from being switched on when the tank is empty, as an explosion might be caused thereby. Such means are preferably automatic, and may, for example, comprise a snap switch associated with, and adapted to be operated by, the abovementioned float. In addition to the aforesaid instruments and controls, the apparatus may also, as usual, be fitted with a gas meter in the pipe leading the generated gases to the gas holder, and an electric meter (and, if desired, an ammeter and/or voltmeter) in the electric supply lines.

In modifications of the apparatus the fixed strip electrodes may be replaced by concentric annuli, or by rows of square, circular or other shaped plates (in staggered disposition, if desired) or by zig-zag or wave-shaped strips (allowing increased length of the space between adjacent electrodes) and the framework or shelf may be circular or of other shape according to circumstances.

In a further modification of the apparatus a plurality of shelves such as described above may be supported in spaced superposed relationship in a suitable support (which may be of box-like form) all being immersed in the hydrocarbon. In such an arrangement there may be provided beneath each shelf inclined planes extending from a centre-line of the shelf to the walls of the box-like support. Apertures through the walls of the box-like support beneath these inclined planes at their junction allow escape of gas generated on the next lower shelf, and other apertures in the walls of the box-like support where the inclined planes are joined or secured thereto, allow residue portions of disintegrated particles from the shelf above to fall out of the support. Provision is made to supply current individually or collectively, at the will of an operator, to the various shelves, and indicator lamps may be provided externally of the apparatus to show when each shelf is working or ready to operate. Preferably each shelf is provided with an indicator lamp, the circuit to which runs transversely across the electrodes and particle-containing channels of the shelf. Thus, when the shelf is not in operation the settled particles complete the lamp circuit which thus lights the lamp, provided an adequate layer of particles is present. If more carbon particles are required, the lamp fails to light, drawing attention to the deficiency. When the apparatus is properly in operation the disturbance of the particles breaks the lamp circuit and the lamps are thus extinguished. Different coloured lamps may be employed for the various shelves. Suitable switch means may be provided in the supply and indicator circuits to allow the whole of the apparatus or one or more selected parts thereof to be operated at will.

It will be appreciated that with all the forms of apparatus described above the selected values of the variable factors, e. g. dimensions, operating conditions, voltage etc. determine the time of discharge between two granules and the time intervals between successive discharges. These times can be measured by an oscillograph and it has been found that optimum results are obtained if the time interval between successive local discharges is of the order of 100 times as great as the time during which a discharge occurs. This timing allows production of good quality carbon black without interfering with the proper formation and cooling of the desired gaseous products by continued dissociation thereof.

Using the method and apparatus described above it has been found possible to produce gases containing a high percentage (which may be up to 50% or more) of acetylene and to produce good quality carbon black equivalent to 24% of the raw material consumed. The exhaust gases (i. e. the residue after removal of acetylene, and including ethylene, propylene, methane, hydrogen etc.) has a high calorific value. It will be noted that the invention achieves regularity in operation and production through the automatic self adjustment and continuous operation of the apparatus for long periods in the electro-pyrolysis of various liquid hydrocarbons, and particularly in the production of acetylene, its other attendant gases and highly dispersed carbon black from liquid hydrocarbons.

This is achieved by creating, in the material to be processed, numerous low power nuclei of high temperature lying close to each other on a substantially horizontal plane, immersed in the liquid to be processed, and in constant movement up and down, and this result may be achieved by apparatus such as described herein the basic feature of which is the above described provision of a constant uniform shallow layer of mobile conducting particles between which arcs are discharged.

It will be seen, therefore, that the invention provides a simple, cheap and continuous operation for production of carbon black and acetylene from a wide variety of petroleum products and like hydrocarbons. It should be understood, however, that the invention is not limited solely to the details of operation and construction of the forms of apparatus and methods of procedure described, since these may be modified in order to meet various working conditions and requirements encountered without departing in any way from the scope of the invention.

The apparatus disclosed by the foregoing and by the accompanying drawings forms a part of a continuation-in-part application filed by the present inventor on January 9, 1953, bearing Serial No. 330,431, and containing claims based on this apparatus.

I claim:

1. A method for processing liquid hydrocarbons by electric arcing within the liquid, comprising gravitationally depositing individually free and separate electrode granules in the liquid over a substantially flat horizontal support provided with a sideways retaining structure and immersed a substantial depth in the liquid, the granules gravitationally settling on the support within the retaining structure and being of substantially uniform dimensions and only a sufficient number of the granules being deposited in the liquid to form a substantially horizontally continuous shallow layer of from one to two granules deep only during the processing, and substantially continuously exposing horizontally interspaced portions of the layer to electric power at a potential causing arcing between substantially horizontally adjacent ones of the granules between said portions, the latter being interspaced to an extent of a plurality of the granules, the dimensions of the granules and the electric power potential being related so that the arcing causes conversion of the liquid to gas forcibly enough to blow the granules upwardly into the liquid thereabove and separate the adjacent granules and destroy the layer's continuity between said portions and terminate the arcing for time periods required for the granules in the liquid to gravitationally settle and form the horizontally continuous layer between said portions and thus again effect arcing between substantially horizontally adjacent ones of the granules and destruction again of the layer's continuity, whereby each of the granules is subjected intermittently to the arcing with interposed intervals of motion while entirely surrounded by the liquid.

2. A method for processing liquid hydrocarbons by electric arcing within the liquid, comprising gravitationally depositing individually free and separate electrode granules in the liquid over a substantially flat horizontal support provided with a sideways retaining structure and immersed a substantial depth in the liquid, the granules gravitationally settling on the support within the retaining structure and being of substantially uniform dimensions and only a sufficient number of the granules being deposited in the liquid to form a substantially horizontally continuous shallow layer of from one to two granules deep only during the processing, and substantially continuously exposing horizontally interspaced portions of the layer to electric power at a potential causing arcing between substantially horizontally adjacent ones of the granules between said portions, the latter being interspaced to an extent of a plurality of the granules, the dimensions of the granules and the electric power potential being related so that the arcing causes conversion of the liquid to gas forcibly enough to blow the granules upwardly into the liquid thereabove and separate the adjacent granules and destroy the layer's continuity between said portions and terminate the arcing for time periods required for the granules in the liquid to gravitationally settle and form the horizontally continuous layer between said portions and thus again effect arcing between substantially horizontally adjacent ones of the granules and destruction again of the layer's continuity, whereby granules are subjected intermittently to the arcing with interposed intervals of motion while entirely surrounded by the liquid; the granules wearing and reducing in size during the processing with a consequent increase in the value of the electric power required to maintain the potential required for the arcing, and removing from the liquid above the support during the processing granules reduced to a predetermined size and granules of larger size being added in the liquid above the support as required to maintain a sufficient number of granules in the liquid above the support to form the layer of from one to two granules deep.

3. A method for processing liquid hydrocarbons by electric arcing within the liquid, comprising gravitationally depositing individually free and separate electrode granules in the liquid over a substantially flat horizontal support provided with a sideways retaining structure and immersed a substantial depth in the liquid, the granules gravitationally settling on the support within the retaining structure and being of substantially uniform dimensions and only a sufficient number of the granules being deposited in the liquid to form a substantially horizontally continuous shallow layer of from one to two granules deep only during the processing, and substantially continuously exposing horizontally interspaced portions of the layer to electric power at a potential causing arcing between substantially horizontally adjacent ones of the granules between said portions, the latter being interspaced to an extent of a plurality of the granules, the dimensions of the granules and the electric power potential being related so that the arcing causes conversion of the liquid to gas forcibly enough to blow the granules upwardly into the liquid thereabove and separate the adjacent granules and destroy the layer's continuity between said portions and terminate the arcing for time periods required for the granules in the liquid to gravitationally settle and form the horizontally continuous layer between said portions and thus again effect arcing between substantially horizontally adjacent ones of the granules and destruction again of the layer's continuity, whereby each of the granules is subjected intermittently to the arcing with interposed intervals of motion while entirely surrounded by the liquid; the gas rising through and escaping from the liquid and the latter being substantially continuously cooled during the processing, whereby to cool the gas and to cool the granules while the latter are moving through and are surrounded by the liquid.

4. A method for processing liquid hydrocarbons by electric arcing within the liquid, comprising gravitationally depositing individually free and separate electrode granules in the liquid over a substantially flat horizontal support provided with a sideways retaining structure and immersed a substantial depth in the liquid, the granules gravitationally settling on the support within the retaining structure and being of substantially uniform dimensions and only a sufficient number of the granules being deposited in the liquid to form a substantially horizontally continuous shallow layer of from one to two granules deep only during the processing, and substantially continuously exposing horizontally interspaced portions of the layer to electric power at a potential causing arcing between substantially horizontally adjacent ones of the granules between said portions, the latter being interspaced to an extent of a plurality of the granules, the dimensions of the granules and the electric power potential being related so that the arcing causes conversion of the liquid to gas forcibly enough to blow the granules upwardly into the liquid thereabove and separate the adjacent granules and destroy the layer's continuity between said portions and terminate the arcing for time periods required for the granules in the liquid to gravitationally settle and form the horizontally continuous layer between said portions and thus effect arcing between substantially horizontally adjacent ones of the granules and destruction again of the layer's continuity, whereby each of the granules is subjected intermittently to the arcing with interposed intervals of motion while entirely surrounded by the liquid; the electric power being in the form of alternating current.

5. A method for processing liquid hydrocarbons by electric arcing within the liquid, comprising gravitationally depositing individually free and separate electrode granules in the liquid over a substantially flat horizontal support provided with a sideways retaining structure and immersed a substantial depth in the liquid, the granules gravitationally settling on the support within the retaining structure and being of substantially uniform dimensions and only a sufficient number of the granules being deposited in the liquid to form a substantially horizontally continuous shallow layer of from one to two granules deep only during the processing, and substantially continuously exposing horizontally interspaced portions of the layer to electric power at a potential causing arcing between substantially horizontally adjacent ones of the granules between said portions, the latter being interspaced to an extent of a plurality of the granules, the dimensions of the granules and the electric power potential being related so that the arcing causes conversion of the liquid to gas forcibly enough to blow the granules upwardly into the liquid thereabove and separate the adjacent granules and destroy the layer's continuity between said portions and terminate the arcing for time periods required for the granules in the liquid to gravitationally settle and form the horizontally continuous layer between said portions and thus again effect arcing between substantially horizontally adjacent ones of the granules and destruction again of the layer's continuity, whereby each of the granules is subjected intermittently to the arcing with interposed intervals of motion while entirely surrounded by the liquid; at least the liquid and the granules being maintained free from moisture during the processing.

6. A method for processing liquid hydrocarbons by electric arcing within the liquid, comprising gravitationally depositing individually free and separate electrode granules in the liquid over a substantially flat horizontal support provided with a sideways retaining structure and immersed a substantial depth in the liquid, the granules gravitationally settling on the support within the retaining structure and being of substantially uniform dimensions and only a sufficient number of the granules being deposited in the liquid to form a substantially horizontally continuous shallow layer of from one to two granules deep only during the processing, and substantially continuously exposing horizontally interspaced portions of the layer to electric power at a potential causing arcing between substantially horizontally adjacent ones of the granules between said portions, the latter being interspaced to an extent of a plurality of the granules, the dimensions of the granules and the electric power potential being related so that the arcing causes conversion of the liquid to gas forcibly enough to blow the granules upwardly into the liquid thereabove and separate the adjacent granules and destroy the layer's continuity between said portions and terminate the arcing for time periods required for the granules in the liquid to gravitationally settle and form the horizontally continuous layer between said portions and thus again effect arcing between substantially horizontally adjacent ones of the granules and destruction again of the layer's continuity, whereby each of the granules is subjected intermittently to the arcing with interposed intervals of motion while entirely surrounded by the liquid; the support being positioned respecting the surface level of the liquid to position the layer about from 20 to 30 centimeters below the surface level.

7. A method for processing liquid hydrocarbons by electric arcing within the liquid, comprising gravitationally depositing individually free and separate electrode granules in the liquid over a substantially flat horizontal support provided with a sideways retaining structure and immersed a substantial depth in the liquid, the granules gravitationally settling on the support within the retaining structure and being of substantially uniform dimensions and only a sufficient number of the granules being deposited in the liquid to form a substantially horizontally continuous shallow layer of from one to two granules deep only during the processing, and substantially continuously exposing horizontally interspaced portions of the layer to electric power at a potential causing arcing between substantially horizontally adjacent ones of the granules between said portions, the latter being interspaced to an extent of a plurality of the granules, the dimensions of the granules and the electric power potential being related so that the arcing causes conversion of the liquid to gas forcibly enough to blow the granules upwardly into the liquid thereabove and separate the adjacent granules and destroy the layer's continuity between said portions and terminate the arcing for time periods required for the granules in the liquid to gravitationally settle and form the horizontally continuous layer between said portions and thus again effect arcing between substantially horizontally adjacent ones of the granules and destruction again of the layer's continuity, whereby each of the granules is subjected intermittently to the arcing with interposed intervals of motion while entirely surrounded by the liquid; the electric power being in the form of a pulsating current.

WLADIMIR v. EDIGER.

REFERENCES CITED

The following references are of record in the file of this patent:

UNITED STATES PATENTS

| Number | Name | Date |
|---|---|---|
| 1,218,817 | Tennant | Mar. 13, 1917 |
| 2,353,770 | Suits | July 18, 1944 |